Patented Apr. 21, 1936

2,037,712

UNITED STATES PATENT OFFICE 2,037,712

PROCESS OF EFFECTING CHEMICAL REACTIONS

Clarence J. Frankforter, Lincoln, Nebr., and Dwight B. Mapes, Wilmington, Calif., assignors to Frankforter Oil Process, Inc., Omaha, Nebr., a corporation of Nebraska No Drawing. Application March 30, 1931, Serial No. 526,452

1 Claim. (Cl. 204—31)

The present invention relates to a process for efficiently bringing about chemical reactions and more particularly to a method of reacting upon organic compounds.

Primarily the invention relates to reduction of organic compounds with hydrogen in a high state of activation whereby various organic compounds are produced which at the present time can be obtained only by expensive commercial procedure.

The process of this invention is conducted with an apparatus and following the method outlined in our copending application filed March 30, 1931, Serial No. 526,453.

In this application we have described a method of activating hydrogen externally of the reaction chamber or line and wherein the hydrogen is activated by contact with a heated granular material such as pumice, which is coated or impregnated with an activating substance such as platinum, nickel, or their alloys, and confined in a passage outside of the reaction chamber. We have, moreover, described a method of activation wherein an electric resistance element of platinum, nickel-chromium, platinum-iridium, or similar alloys, is interposed in the passage for the purpose of activating the hydrogen, and as a further embodiment of this idea we have disclosed a very efficient method wherein an impressed voltage is employed whereby highly energized particles traverse the path of the gas through the passage and activate it to a very high degree. Thorough activation takes place by thermionic effect, or the interposition of an electrostatic field, which causes a bombardment of the gas molecules by electrically charged particles.

By any one of the methods outlined, the gas is activated substantially out of contact with the reaction chamber so that the activating means of itself will exert no effect upon the organic reactions contemplated. Furthermore, a fresh supply of constantly activated gas will be supplied to the reaction chamber in a maximum state of activation or in the optimum condition for the particular reaction.

Following out either of these methods, the present invention contemplates the reduction of organic compounds such as esters, phenols, aldehydes, ketones, nitro derivatives and sulphonates, unsaturated compounds and various related organic combinations.

The reaction may be carried out with the organic materials in either the liquid or the vapor phase, and it is only necessary that the activated hydrogen be supplied to the liquid or vapors in such a manner as to permit intimate contact and complete reaction. This will be accomplished in accordance with the apparatus of our aforesaid application and following the process therein outlined.

The pressures employed, will necessarily vary with the specific organic compound under treatment, and the activated gas will be supplied to the reaction chamber at a pressure sufficient to prevent diffusion of the organic materials when in gaseous phase into the activating passage and when in the liquid phase sufficient to permit the activated gas to bubble through the liquid. In other words, in the vapor phase the activated hydrogen will be supplied at a pressure preferably but slightly greater than that of the vapors in order to produce intimate contact and optimum reaction and in the liquid phase the activated gas will be supplied at a pressure and in such a manner that the bubbles of activated hydrogen will pass into the liquid and enable the reaction to go forward to the desired end.

With respect to temperatures, the temperature of the gas will preferably be controlled dependent upon the nature of the organic compound under treatment and we would say that the activating material should be at a temperature somewhere between 500° F. and 1700° F., for the best results. While we prefer an apparatus as set forth in said copending application, it will be understood that we will use the apparatus and process set forth in the patent to Clarence J. Frankforter, No. 1,780,873, November 4, 1930.

It will be understood that the invention contemplates obtaining reduction of organic compounds, many of which are, of course, well known, as well as different products by the process herein outlined.

The advantages of the present process over known commercial methods will at once be appreciated. With present reduction and hydrogenation reactions which require a catalyst, the effectiveness of the catalyst upon which the process depends is subject at all times to the disadvantages of poisoning. Thus the presence of small quantities of certain impurities, such as sulphur, arsenic or phosphorus in the organic material under treatment will so completely poison the catalyst as to seriously impair the results. In order to obviate such difficulties at the present time, the organic raw material is subjected to various purifying processes to remove all traces of these catalystic poisons, and since this must be accomplished before the catalystic hydrogenation or reduction can be carried out, the cost of the reaction is materially increased and in many cases is prohibitive.

By the present invention we have discovered a means of effectively and economically activating hydrogen to a very remarkable degree and employ a process whereby organic reduction reactions can be effectively carried out to give uniformly successful results. By our process it becomes unnecessary to remove so-called catalytic poisons and to this end it will be observed that the activation of the hydrogen takes place externally of the reaction chamber so that there is no possibility of catalytic impairment, and in fact catalysis is not resorted to in the reaction.

While we have referred in this case to a reduction process employing activated hydrogen, it may be understood that we may, in a similar manner, produce oxygenated products by activating the oxygen in a similar manner and supplying it to various organic materials in either liquid or vapor phase in accordance with the method described. Specifically, we use our process for treating various types of organic compounds capable of being reacted upon by activated oxygen, such as hydrocarbons of various series, alcohols, aldehydes, and amino derivatives, as well as other organic materials.

Furthermore, in referring herein to hydrogen and oxygen as the gases which will be activated, it will be understood that we may use any hydrogen containing gas or any oxygen containing gas which may be activated by our process.

We claim:

The process of treating liquid organic compounds of the order of esters, phenols, aldehydes, ketones, nitro derivatives, and sulphonates, for effecting reduction thereof which comprises conducting to said organic compounds for intimate contact and reaction therewith, a gas containing hydrogen, activating said gas by contact through its path of travel with a separately heated electrical resistance element from which highly energized electrically charged particles are attracted by an electrostatic field whereby activation of the gas is produced by impacts between said charged particles and the said gas and located at a point externally of the reaction, and reacting said gas with the organic compound.

CLARENCE J. FRANKFORTER.
DWIGHT B. MAPES.